United States Patent
Tsai Chen

(10) Patent No.: US 8,107,166 B2
(45) Date of Patent: Jan. 31, 2012

(54) CABINET PROJECTION SCREEN WITH AUTOMATIC COVER-LIFTING FUNCTION

(75) Inventor: Chang-Hsiu Tsai Chen, Yonghe (TW)

(73) Assignee: Elite Screens China Corp., Longgang District, Guangdong (CN)

( * ) Notice: Subject to any disclaimer, the term of this patent is extended or adjusted under 35 U.S.C. 154(b) by 0 days.

(21) Appl. No.: 12/731,317

(22) Filed: Mar. 25, 2010

(65) Prior Publication Data
US 2011/0235173 A1    Sep. 29, 2011

(51) Int. Cl.
*G03B 21/56* (2006.01)
(52) U.S. Cl. .................................. 359/461; 348/836
(58) Field of Classification Search .............. 359/443, 359/461; 348/836, 838, 842; 353/74
See application file for complete search history.

(56) References Cited

U.S. PATENT DOCUMENTS

| | | | |
|---|---|---|---|
| 5,341,241 A * | 8/1994 | Shopp | 359/443 |
| 6,191,886 B1 * | 2/2001 | Sinkoff | 359/443 |
| 6,430,871 B1 * | 8/2002 | Hebda | 49/340 |
| 7,413,312 B2 * | 8/2008 | Engle et al. | 353/79 |
| 7,458,689 B2 * | 12/2008 | Head et al. | 353/74 |
| 2002/0118151 A1 * | 8/2002 | Chen | 345/84 |
| 2005/0248170 A1 * | 11/2005 | Kawamoto et al. | 296/24.34 |
| 2009/0190212 A1 * | 7/2009 | Wang et al. | 359/461 |

* cited by examiner

*Primary Examiner* — Christopher Mahoney
(74) *Attorney, Agent, or Firm* — Hamre, Schumann, Mueller & Larson, P.C.

(57) ABSTRACT

A cabinet projection screen with an automatic cover-lifting function is provided, which includes a cabinet body (1). A cover-lifting mechanism (2) is disposed on the cabinet body (1). The cover-lifting mechanism (2) includes a cover plate (21), a transmission rod (22), and a cover-plate drive motor (23). The cover-plate drive motor (23) drives the cover plate (21) to open or close through the transmission rod (22). An elevator screen (3) is disposed inside the cabinet body (1). The elevator screen (3) is aligned with an opening (24) on the cabinet corresponding to the cover plate (21) when the cover plate (21) is opened. The cabinet projection screen can be used as a normal office desk or cabinet when not used for projection, and can also be used as a projection screen when necessary, so that a multi-functional office desk or cabinet is obtained.

6 Claims, 4 Drawing Sheets

CABINET PROJECTION SCREEN WITH AUTOMATIC COVER-LIFTING FUNCTION

BACKGROUND OF THE INVENTION

1. Field of Invention

The present invention relates to a projection screen, and more particularly to a cabinet projection screen with an automatic cover-lifting function.

2. Related Art

Currently, a projector is generally used for product, plan, picture, or video presentation during activities such as business conference, teaching demonstration, and mobile office, so as to achieve a large-screen display function. The screen of the projector is usually suspended in an office or some special sites for use due to its large area. However, with the increasingly growing house price in urban areas, the work area or living area of people becomes more and more limited, and as the conventional projection screen needs to occupy a specific position, inconveniences are resulted in the already limited work or living space of people. Therefore, versatile office furniture is urgently needed in houses or offices, so as to realize as many functions as possible, especially the projection function, in a small space.

SUMMARY OF THE INVENTION

The present invention is directed to a cabinet projection screen with an automatic cover-lifting function. The cabinet projection screen can be used as a normal office desk or cabinet when not used for projection, and can also be used as a projection screen when necessary, so that a multi-functional office desk or cabinet is obtained.

In order to solve the above technical problem, the present invention provides a cabinet projection screen with an automatic cover-lifting function, which includes a cabinet body. A cover-lifting mechanism is disposed on the cabinet body. The cover-lifting mechanism includes a cover plate, a transmission rod, and a cover-plate drive motor. The cover-plate drive motor drives the cover plate to open or close through the transmission rod. An elevator screen is disposed inside the cabinet body. The elevator screen is aligned with an opening on the cabinet corresponding to the cover plate when the cover plate is opened.

A controller is further disposed on the cabinet body. A limit signal triggering member is disposed on the cover-lifting mechanism. The limit signal triggering member sends a limit signal to the controller when the cover plate rotates to a predetermined position. The controller controls actions of the cover-lifting drive motor.

The elevator screen includes a projection screen, a scroll, a scroll motor driving the scroll to rotate, and a compression frame. The scroll is disposed inside the cabinet body. The projection screen is wound on the scroll. One end of the compression frame is fixed on a free end of the projection screen and the other end thereof is fixed inside the cabinet body. Adjacent support rods are connected through a rotating shaft. An elastic mechanism is installed on the compression frame. Two ends of the elastic mechanism are installed on the adjacent support rods, respectively.

A top cover is disposed at an upper end of the compression frame.

A projection-screen limit-signal triggering member is disposed on the support rod. The projection-screen limit-signal triggering member sends a limit signal to the controller when the projection screen moves to a predetermined position. The controller controls actions of the scroll motor.

An infrared receiver is disposed on the cabinet body. The infrared receiver receives a control signal from a remote control, so as to control the scrolling motor and/or the scroll motor to perform corresponding actions through the controller.

The cover-lifting mechanism and the elevator screen are disposed inside an independent case body. The case body is movably disposed on the cabinet body.

The present invention has the following efficacy. The cabinet projection screen can be used as a normal office desk or cabinet when not used for projection, and can also be used as a projection screen when necessary, so that a multi-functional office desk or cabinet is obtained.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
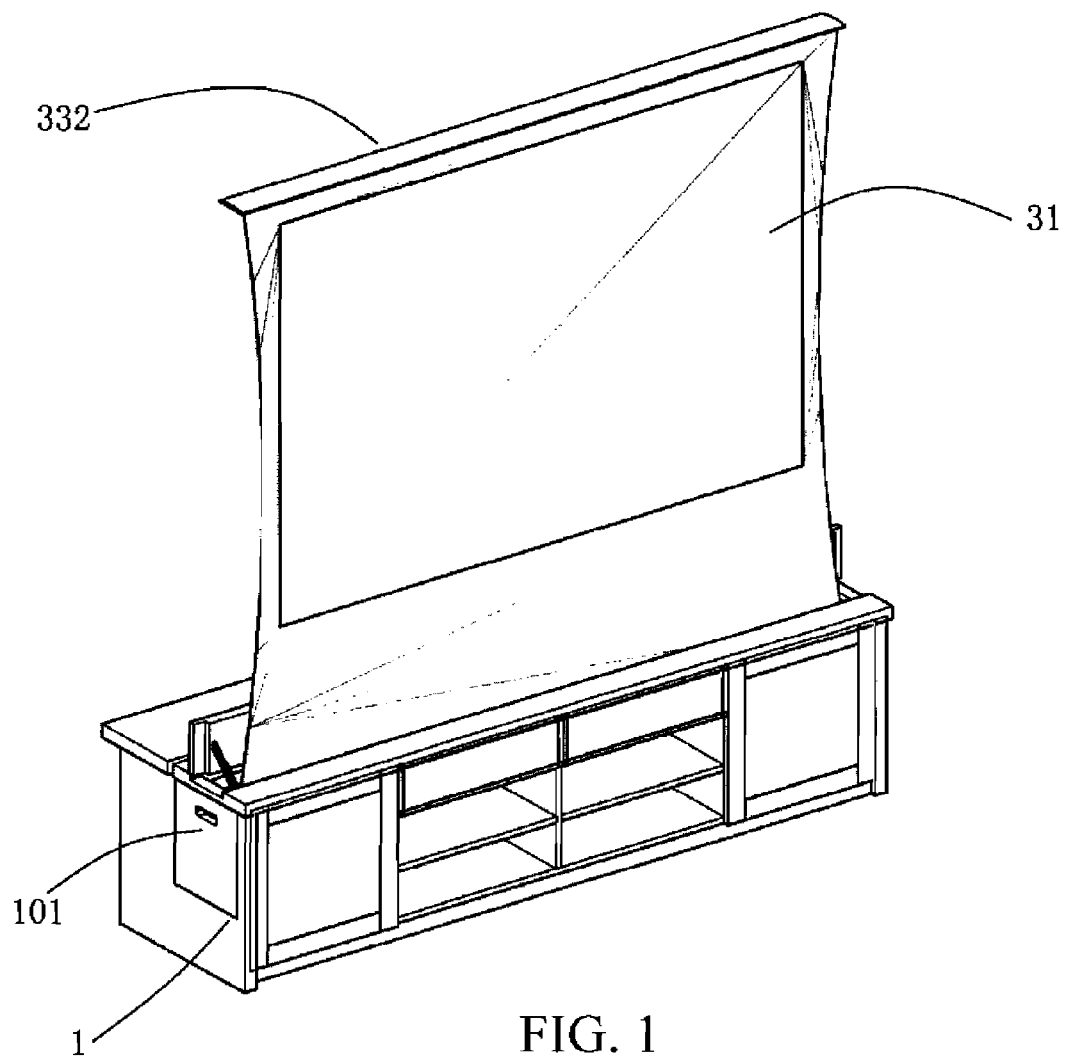
FIG. 1 is a schematic three-dimensional structural view according to an embodiment of the present invention.

Referring to FIGS. 1 to 5, the present invention provides a cabinet projection screen with an automatic cover-lifting function, which includes a cabinet body 1. A cover-lifting mechanism 2 is disposed on the cabinet body 1. The cover-lifting mechanism 2 includes a cover plate 21, a transmission rod 22, and a cover-plate drive motor 23. The cover-plate drive motor 23 drives the cover plate 21 to open or close through the transmission rod 22. An elevator screen 3 is disposed inside the cabinet body 1. The elevator screen 3 is aligned with an opening 24 on the cabinet corresponding to the cover plate 21 when the cover plate cover plate 21 is opened. In this embodiment, the transmission rod 22 includes two parts. When the cover-plate drive motor 23 rotates, the transmission rod 22 drives the cover plate 21 to open upwards or close downwards. When the cover plate 21 is opened, an opening 24 appears on the cabinet body 1. At this time, if necessary, the elevator screen 3 may be raised or lowered through the opening 24. In this embodiment, the cover-plate drive motor 23 is disposed inside the cabinet body 1. When the cover plate 21 needs to be opened upwards, the cover-plate drive motor 23 rotates counterclockwise and the transmission rod 22 supports the cover plate 21. When the cover plate 21 is opened at an angle greater than or equal to 90 degrees, the cover plate is completely opened. When the cover plate 21 needs to be closed, the cover-plate drive motor 23 rotates in an opposite direction. Apparently, the cover-plate drive motor 23 may also be disposed outside the cabinet body 1, and in this manner the cover plate 21 can still be opened or closed through the transmission rod. The only difference is that the driving mode of the cover-plate drive motor 23 is opposite.

Figure 2:
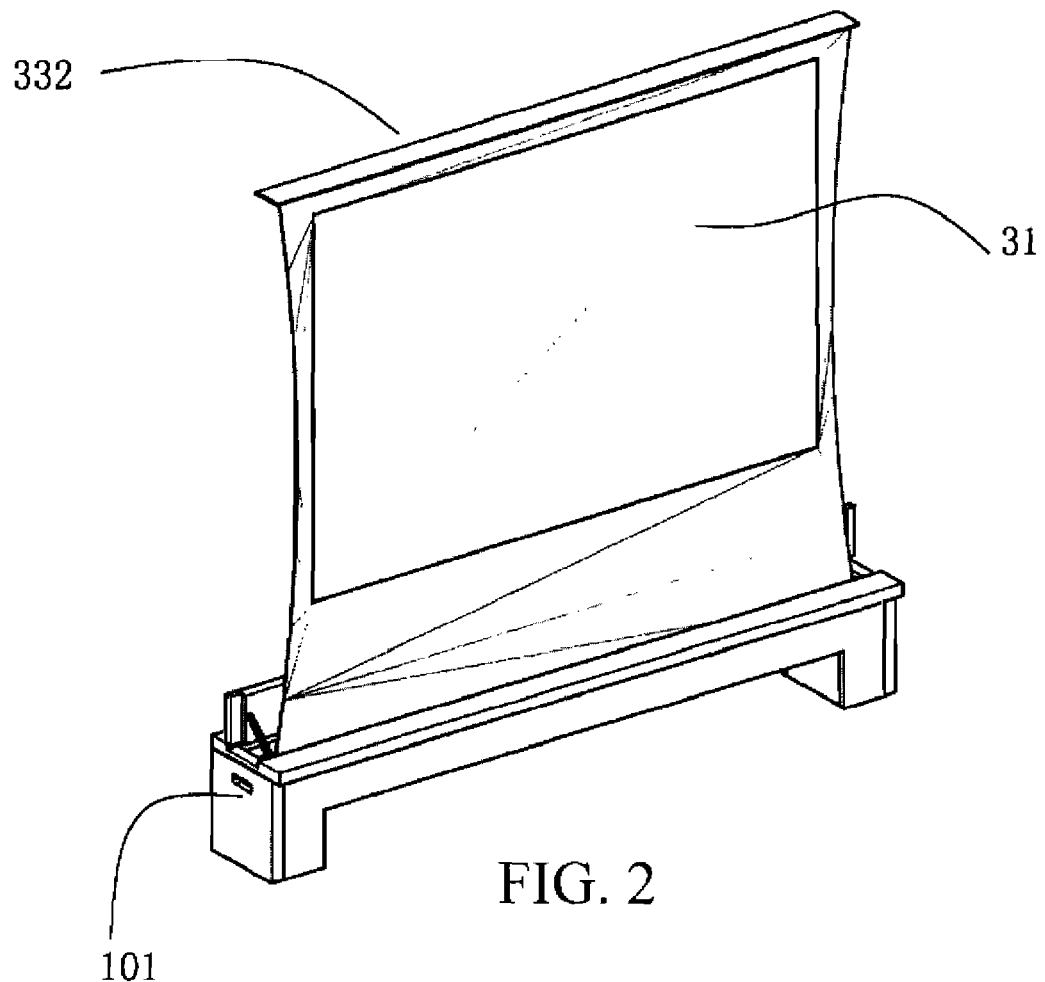
FIG. 2 is a schematic three-dimensional structural view when a projection device is detached.
Figure 3:
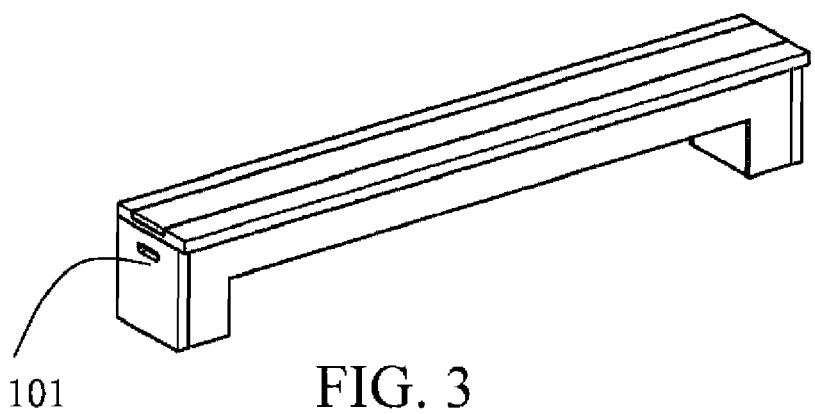
FIG. 3 is a schematic structural view when the cover-lifting mechanism 2 and the elevator screen 3 are completely folded.

In the present invention, as shown in FIGS. 2 and 3, the cover-lifting mechanism 2 and the elevator screen 3 may be disposed inside an independent case body 101. The case body 101 is movably disposed on the cabinet body 1. Thereby, when the projection function needs to be used separately, the cover-lifting mechanism 2 and the elevator screen 3 can be taken from the cabinet body and used as a separate projection device. FIG. 3 shows a status that the cover-lifting mechanism 2 and the elevator screen 3 are completely folded.

A controller 4 is further disposed on the cabinet body 1. A limit signal triggering member (not shown) is disposed on the cover-lifting mechanism 2. The limit signal triggering member sends a limit signal to the controller 4 when the cover plate 21 rotates to a predetermined position. The controller 4 controls actions of the cover-lifting drive motor 23. Specifically, when the cover plate 21 is opened and rotates for 90 degrees, or when the cover plate 21 is closed to cover the opening 24, the limit signal triggering member sends a limit signal to the controller 4. The controller 4 controls the cover-lifting drive motor 23 to drive motor 23 to perform corresponding actions. In this embodiment, the limit signal triggering member may be two contacts or other elements, such as a photoelectric switch or a travel switch.

Figure 4:
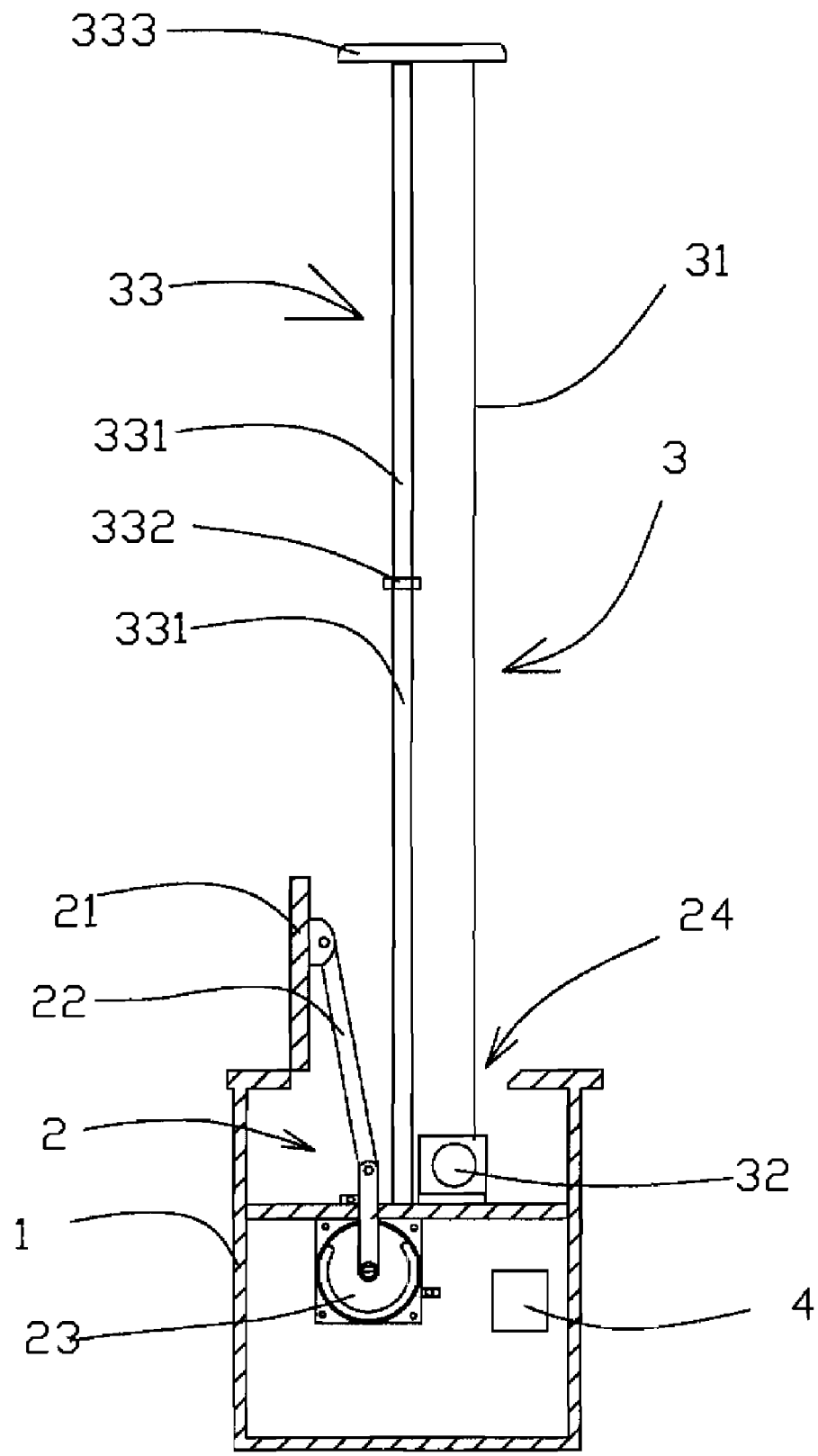
FIG. 4 is a schematic cross-sectional view of the structure in FIG. 1.
Figure 5:
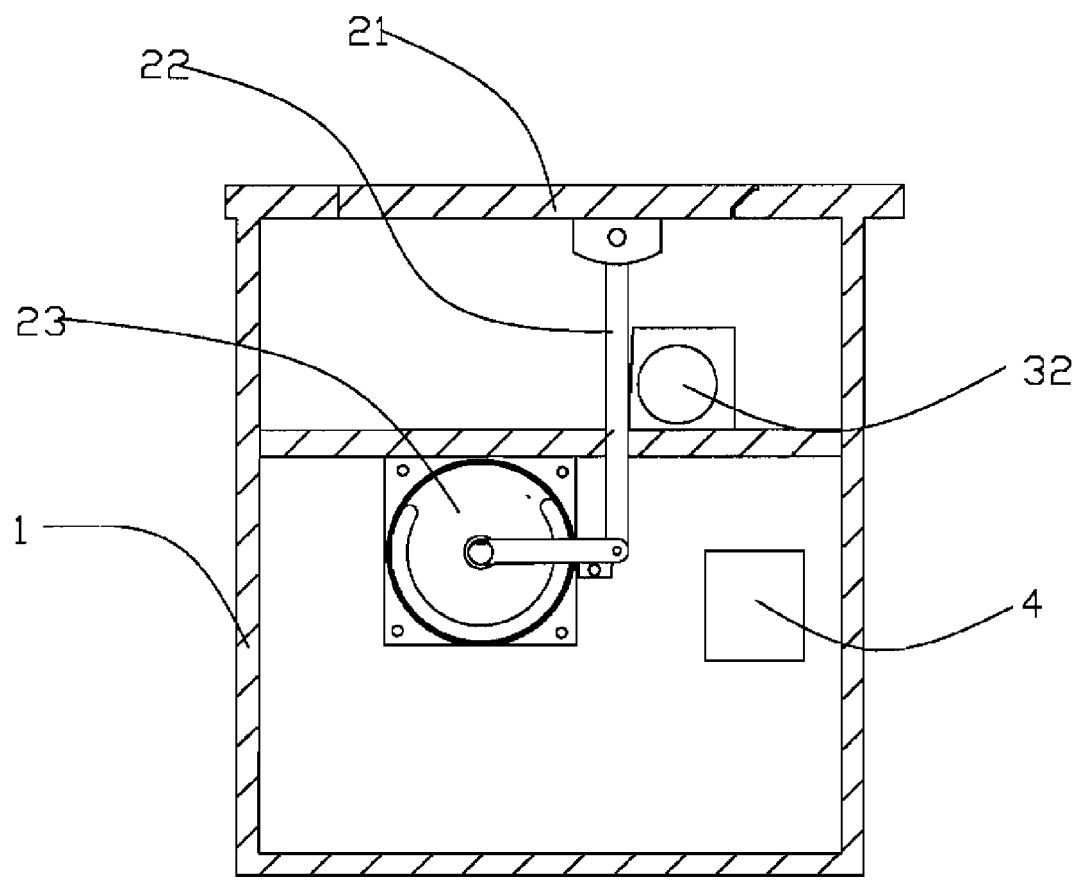
FIG. 5 is a schematic cross-sectional view after the structure in FIG. 4 is folded.

Referring to FIG. 4, the elevator screen 3 includes a projection screen 31, a scroll, a scroll motor 32 driving the scroll to rotate, and a compression frame 33. The scroll is disposed inside the cabinet body 1. The projection screen 31 is wound on the scroll. One end of the compression frame 33 is fixed on a free end of the projection screen 31 and the other end thereof is fixed inside the cabinet body 1. Adjacent support rods 331 are connected through a rotating shaft 332. An elastic mechanism is installed on the compression frame 33. Two ends of the elastic mechanism are installed on the adjacent support rods 331, respectively. A top cover 333 is disposed at an upper end of the compression frame 33. A projection-screen limit-signal triggering member is disposed on the support rod 331. The projection-screen limit-signal triggering member sends a limit signal to the controller 4 when the projection screen 31 moves to a predetermined position. The controller 4 controls actions of the scroll motor 32. For the specific structure of the elevator screen 3, reference may be made to a prior patent of the applicant, that is, Patent No. 200820213004.8.

An infrared receiver is disposed on the cabinet body. The infrared receiver receives a control signal from a remote control, so as to control the scrolling motor 23 and/or the scroll motor 32 to perform corresponding actions through the controller 4.

The examples in the above embodiments are merely the most preferred examples for illustrating the present invention and are not intended to limit the scope of the invention. Any slight changes or replacements made according to the principles of the present invention shall fall within the scope of the present invention.

What is claimed is:

1. A cabinet projection screen with an automatic cover-lifting function, comprising:
    a cabinet body, wherein a cover-lifting mechanism is disposed on the cabinet body, the cover-lifting mechanism comprises a cover plate, a transmission rod, and a cover-plate drive motor, the cover-plate drive motor drives the cover plate to open or close through the transmission rod, an elevator screen is disposed inside the cabinet body, and the elevator screen is aligned with an opening on the cabinet corresponding to the cover plate when the cover plate is opened,
    wherein the elevator screen comprises a projection screen, a scroll, a scroll motor driving the scroll to rotate, and a compression frame, the scroll is disposed inside the cabinet body, the projection screen is wound on the scroll, one end of the compression frame is fixed on a free end of the projection screen and the other end thereof is fixed inside the cabinet body, adjacent support rods are connected through a rotating shaft, an elastic mechanism is installed on the compression frame, and two ends of the elastic mechanism are installed on the adjacent support rods respectively.

2. The cabinet projection screen with an automatic cover-lifting function according to claim 1, wherein a controller is further disposed on the cabinet body, a limit signal triggering member is disposed on the cover-lifting mechanism, the limit signal triggering member sends a limit signal to the controller when the cover plate rotates to a predetermined position, and the controller controls actions of the cover-lifting drive motor.

3. The cabinet projection screen with an automatic cover-lifting function according to claim 2, wherein an infrared receiver is disposed on the cabinet body, and used for receiving a control signal from a remote control, so as to control the scrolling motor and/or the scroll motor to perform corresponding actions through the controller.

4. The cabinet projection screen with an automatic cover-lifting function according to claim 1, wherein a top cover is disposed at an upper end of the compression frame.

5. The cabinet projection screen with an automatic cover-lifting function according to claim 4, wherein a projection-screen limit-signal triggering member is disposed on the support rod, the projection-screen limit-signal triggering member sends a limit signal to the controller when the projection screen moves to a predetermined position, and the controller controls actions of the scroll motor.

6. The cabinet projection screen with an automatic cover-lifting function according to claim 1, wherein the cover-lifting mechanism and the elevator screen are disposed inside an independent case body, and the case body is movably disposed on the cabinet body.

* * * * *